United States Patent
Takahashi et al.

(10) Patent No.: US 7,489,603 B2
(45) Date of Patent: Feb. 10, 2009

(54) OPTICAL PICKUP TRANSFER APPARATUS

(75) Inventors: Kazuo Takahashi, Tsurugashima (JP); Ichiro Sugai, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 20 days.

(21) Appl. No.: 10/594,621

(22) PCT Filed: Mar. 22, 2005

(86) PCT No.: PCT/JP2005/005637

§ 371 (c)(1),
(2), (4) Date: Jul. 16, 2007

(87) PCT Pub. No.: WO2005/096283

PCT Pub. Date: Oct. 13, 2005

(65) Prior Publication Data

US 2007/0280082 A1    Dec. 6, 2007

(30) Foreign Application Priority Data

Mar. 31, 2004   (JP) .............................. 2004-102813

(51) Int. Cl.
*G11B 7/00* (2006.01)

(52) U.S. Cl. .................................. 369/44.32; 369/53.12
(58) Field of Classification Search ....................... None
See application file for complete search history.

(56) References Cited

U.S. PATENT DOCUMENTS

| 6,434,096 B1* | 8/2002 | Akagi et al. ............. 369/44.32 |
| 2002/0039329 A1 | 4/2002 | Yonezawa |
| 2005/0157610 A1* | 7/2005 | Osada et al. ............. 369/44.14 |

FOREIGN PATENT DOCUMENTS

| JP | 7-93767 | 4/1995 |
| JP | 2001-210029 | 8/2001 |

* cited by examiner

*Primary Examiner*—Paul Huber
(74) *Attorney, Agent, or Firm*—Drinker Biddle & Reath LLP (57) ABSTRACT

An apparatus including a first engaging portion for holding an optical pickup, a second engaging portion to be engaged with the first engaging portion, a transfer portion for driving the second engaging portion to transfer the first engaging portion in a radial direction, a calculating portion for calculating a backlash value between the first and second engaging portions in a transfer direction of the first engaging portion, and a driving control unit. The driving control unit controls a driving portion to transfer the optical pickup based on a calculated backlash value.

10 Claims, 10 Drawing Sheets

OPTICAL PICKUP TRANSFER APPARATUS

This application is a 371 of PCT/JP05/05637, filed Mar. 22, 2005.

TECHNICAL FIELD

The present invention relates to an optical pickup transfer apparatus and more particularly to an optical pickup sled transfer apparatus.

BACKGROUND ART

With an increase in the recording density of an optical disc, there has been increased a demand for the performance of a transfer apparatus for performing a sled transfer (sliding transport) for an optical pickup. For example, a blue-ray disc (BD) for recording and reproducing an optical disc by using a blue laser has a track pitch of ½ or less of a digital versatile disc (DVD). Accordingly, it is desirable that the feeding accuracy of an optical pickup for the blue-ray disc should also be set to be ½ or less than that of an optical pickup for the DVD. If the setting is to be implemented with an enhancement in mechanical precision, a cost is greatly increased.

A mechanism for converting the rotation of a motor into a linear motion by means of a gear or a feed screw is used for transferring the optical pickup. However, a gear to be used in the transfer apparatus has a backlash, thereby bringing a state in which the optical pickup is not transferred even if the feed screw is rotated. Such a non-transfer state has become an important factor of a deterioration in an accuracy. Moreover, a dead zone is caused by the backlash so that a control performance such as a follow-up delay is deteriorated. Accordingly, a high machine accuracy has been required for the gear in order to reduce the backlash, or a mechanism for performing pushing by means of a spring has been required to be additionally provided. Alternatively, a plurality of guide shafts has been provided or there has been devised the shape of an elastic support portion for elastically coupling a pickup support portion to a rack portion or a feed screw portion (see, Japanese Patent Application Kokai No. 2003-263848).

More specifically, a conventional transferring mechanism of a pickup device is capable of decreasing the influence of a backlash to suppress a vibration and a delay. However, the conventional transferring mechanism has a problem in that a machine accuracy is required or a structure becomes complicated, resulting in an increase in a cost when a high performance is to be obtained. In the conventional technique, furthermore, a method of increasing the elastic support force of an elastic support portion for elastically coupling a pickup support portion to a rack portion or a feed screw portion is used as a method of suppressing a mechanical backlash in some cases. In these cases, however, a drawback such as a loss of synchronism is caused by an increase in a driving load. In the worst case, there has also been a problem in that a transfer operation as an original object cannot be carried out.

DISCLOSURE OF THE INVENTION

The present invention has been made in order to solve the problems and has an object to provide a pickup transfer apparatus capable of suppressing the influence of a backlash even if the transfer portion of a pickup has the backlash and performing a stable transfer operation with high precision, for example.

The invention provides a pickup transfer apparatus for transferring an optical pickup in a radial direction of a recording medium, comprising a first engaging portion for holding the optical pickup, a second engaging portion to be engaged with the first engaging portion, a transfer portion for driving the second engaging portion to transfer the first engaging portion in the radial direction, a calculating portion for calculating a backlash value between the first and second engaging portions in a transfer direction of the first engaging portion, and a driving control unit for controlling the transfer portion based on the backlash value calculated in the calculating portion.

Moreover, the invention provides a method of transferring a pickup which transfers an optical pickup held in a first engaging portion in a radial direction of a recording medium by driving a second engaging portion to be engaged with the first engaging portion, comprising the steps of calculating a backlash value between the first and second engaging portions in a transfer direction of the first engaging portion, and driving the second engaging portion to transfer the first engaging portion based on the backlash value thus calculated.

BRIEF DESCRIPTION OF THE DRAWINGS

FIG. 4 is a flowchart showing a procedure for a control in the execution of tracking pull-in.

EMBODIMENTS FOR CARRYING OUT THE INVENTION

Embodiments of the present invention will be described below in detail with reference to the drawings. In the embodiments which will be described below, equivalent components have the same reference numerals.

First Embodiment

Figure 1:
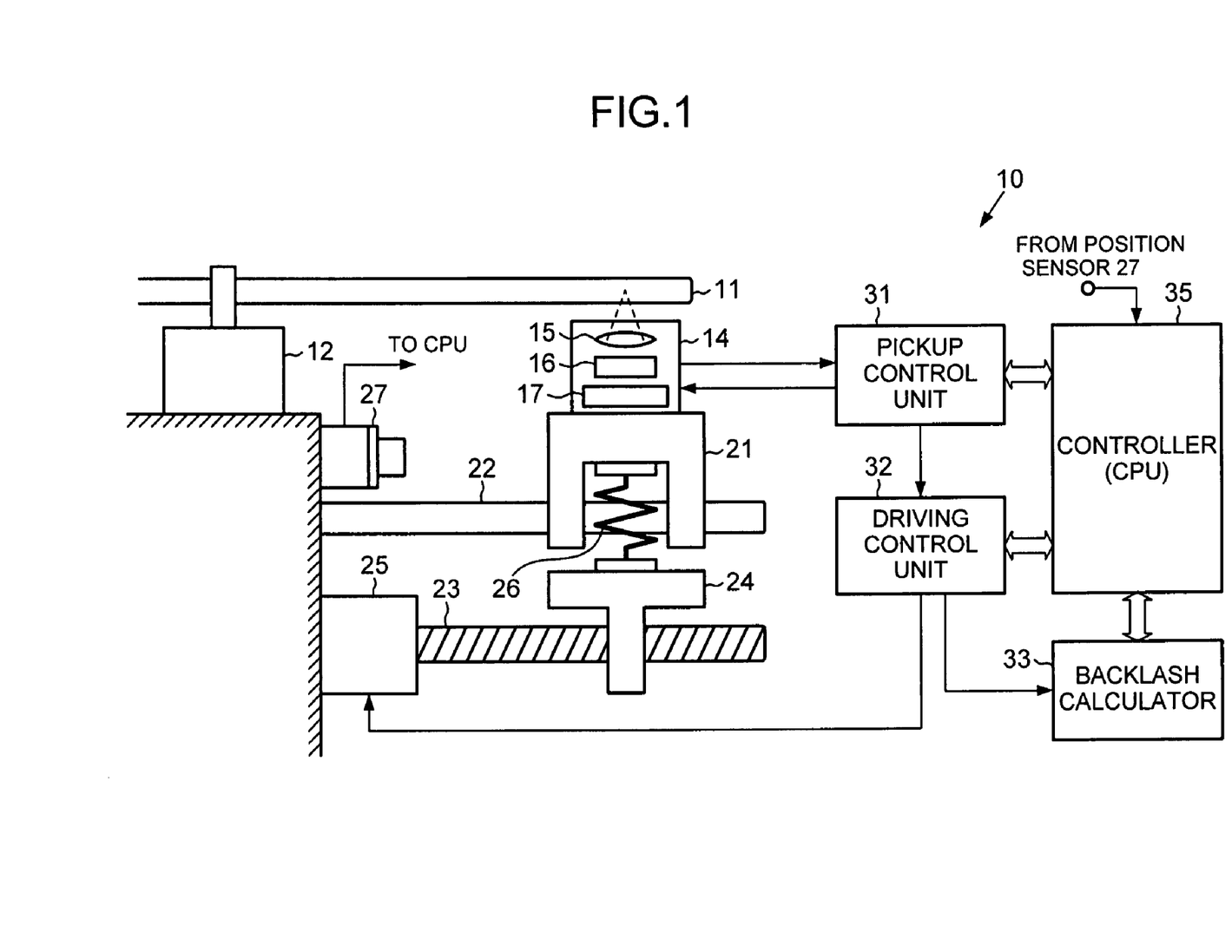
FIG. 1 is a block diagram schematically showing the configuration of an optical-pickup transfer apparatus according to a first embodiment of the present invention.

FIG. 1 is a block diagram schematically illustrating the configuration of an optical-pickup transfer apparatus 10 according to a first embodiment of the present invention.

The optical-pickup transfer apparatus 10 is provided in an optical disc recording and/or reproducing apparatus for recording/reproducing an information signal on/from an optical disc. The optical-pickup transfer apparatus 10 includes a spindle motor 12 for rotating an optical disc 11 and an optical pickup 14 for recording and reproducing an information signal. The optical pickup 14 condenses a light beam emitted from a laser light source by means of an objective lens 15 and detects a read signal reflected from the signal recording surface of the optical disc 11 by means of a photodetector 16. A detection signal detected by the photodetector 16 is supplied to an optical-pickup control unit (hereinafter, simply referred to as a pickup control unit) 31 so that a read data signal (i.e., a reproducing signal) and a pickup control signal (e.g., focus error and tracking error signals) are generated.

The pickup control unit 31 drives the objective lens 15 by means of a biaxial actuator 17 capable of performing driving in a focus direction and a tracking direction in order to position a light beam on the recording surface and recording track of the optical disc 11 based on a pickup control signal.

The dynamic range of a tracking actuator in the biaxial actuator 17 is very small compared to the radius of the disc. For this reason, the optical pickup 14 is subjected to sled feeding (or, sliding) in a radial direction with respect to the rotation of the optical disc 11 based on a sled control signal generated in the pickup control unit 31 in a tracking control.

The pickup transfer apparatus for performing the sled control includes a pickup support portion (or holding portion) 21 for supporting the optical pickup 14, a guide portion 22 for slidably supporting the pickup support portion 21 (hence, the optical pickup 14) in the radial direction of the optical disc, a pickup feeding portion constituted by a rack portion 24 (i.e., a first engaging portion) having a groove formed spirally or like a gear and a feed screw portion 23 (i.e., a second engaging portion) for converting a rotating motion to a linear motion by the groove formed to be engaged with the rack portion 24, a sled motor 25 for rotating the feed screw portion 23, an elastic support portion 26 for elastically coupling the pickup support portion 21 to the pickup feeding portion, and a reference position sensor 27 for detecting the reference position of the pickup support portion 21 (hence, the position of the optical pickup 14). The reference position sensor 27 is a mechanical switch, for example, and is constituted as a switch which is changed into an ON state (or an OFF state) when the optical pickup 14 is placed in a reference position and is changed into the OFF state (or the ON state) when it comes away from the reference position. The reference position sensor 27 is not restricted to the mechanical switch but may be an optical switch, for example. The reference position can be determined as a position in which the optical pickup 14 is placed on the innermost circumference of the information recording region of the optical disc 11, for example. However, the position is not restricted to the innermost circumference position but may be a predetermined fixed position.

Further, the pickup transfer apparatus includes a driving control unit 32 for generating a rotation-drive signal of the sled motor 25 and performing a control such as a servo control, a backlash calculator 33 for calculating the backlash amount (or backlash value) of the pickup feeding portion from the rotation-drive signal of the sled motor 25, and a system controller (hereinafter, simply referred to as a controller) (CPU) 35 for controlling the driving control unit 32 and the pickup control unit 31. A sled control signal generated in the pickup control unit 31 is supplied to the driving control unit 32. Furthermore, a detection signal sent from the reference position sensor 27 which indicates that the optical pickup 14 is placed in the reference position is sent to the controller (CPU) 35. While major signal lines are shown by arrows in FIG. 1, these components may be bidirectionally connected to the controller 35. The controller 35 is constituted to control the whole pickup transfer apparatus.

Next, a pickup transfer (or feeding) operation will be described in detail. The optical disc recording and reproducing apparatus performs an access operation to the optical disc 11 by means of the optical pickup 14 in order to obtain necessary information from the optical disc 11. In the access operation, the optical pickup 14 is transferred or moved in a radial direction with respect to the rotation of the optical disc 11 by the optical-pickup transfer apparatus so as to reach a desirable position. After the transfer, recording and/or reproduction is performed while performing focus and tracking control. In addition to this operation, moreover, an access operation for performing a track jump for moving to a reproducing track by means of a tracking actuator and simultaneously performing transfer of the optical pickup is also executed in some cases.

In the transfer of the optical pickup 14, the sled control signal (a transfer instruction) is transmitted from the controller 35 to the driving control unit 32. The driving control unit 32 generates the driving signal of the sled motor 25 in response to the sled control signal. For example, when a stepping motor is used as the sled motor 25, a signal such as a 2-phase feed pulse, a 1-2 phase feed pulse or a microstep feed pulse is given as the driving signal to a driving circuit corresponding to the amount of a transfer and is converted into a electric current, thereby rotating the sled motor 25. At this time, the feed screw portion 23 provided integrally with the motor shaft of the sled motor 25 is also rotated at the same time and the rotation is thus converted into a linear motion by means of the rack portion 24. The pickup support portion 21 is fixed to the rack portion 24 through the elastic support portion 26. Therefore, the optical pickup 14 is transferred or moved in the radial direction with respect to the rotation of the optical disc 11.

In the transfer operation, when a mechanical looseness is present in the engaging part of the feed screw portion 23 and the rack portion 24, a backlash is generated. The state of the backlash greatly depends on a previous transfer history. More specifically, referring to a direction in which the transfer is to be carried out currently, the backlash is small when the driving operation is carried out in the same direction as that in the previous transfer, and the backlash is larger when the driving operation is carried out in an opposite direction to that in the previous transfer.

Figure 2:
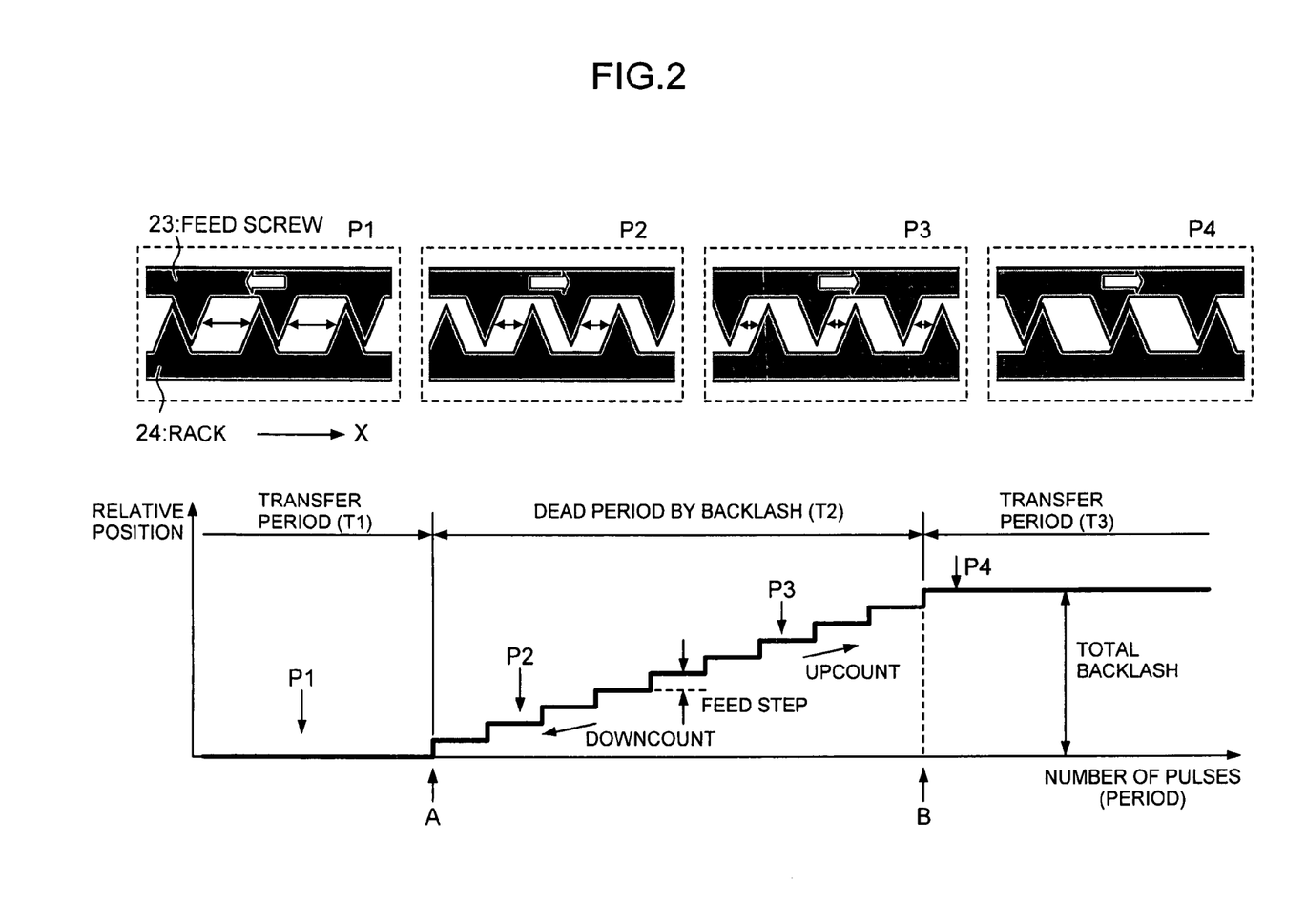
FIG. 2 is a diagram schematically showing a relative position of a feed screw portion with respect to the rack portion when a stepping motor is used for a sled motor.

First of all, description will be made for the principle of a backlash calculation according to the embodiment. FIG. 2 schematically illustrates the relative position of the feed screw portion 23 with respect to the rack portion 24 when a stepping motor is used for the sled motor 25. In more detail, for a period of the movement of the feed screw portion 23 in a −X direction (a leftward direction) in a state in which the teeth of the feed screw portion 23 and the rack portion 24 are engaged with each other (a state P1) as shown in the upper portion of FIG. 2, the backlash is not generated and the relative position is not changed. In other words, the rack portion 24 is moved in the −X direction in the drawing by a distance corresponding to the number of stepping pulses (driving pulses) which are supplied [Transfer Period]. When the feeding direction of the feed screw portion 23 is reversed ("A" in the drawing) and the feed screw portion 23 is moved in a +X direction (a rightward direction), the rack portion 24 is not transferred or moved even if the stepping pulse is supplied because the teeth of the feed screw portion 23 and the rack portion 24 are not engaged with each other due to a gap between the teeth of the feed screw portion 23 and the rack portion 24 (states P2 and P3) [Dead Period or Dead Zone]. When the teeth of the feed screw portion 23 reach a position (B in the drawing) in which they are engaged with the teeth of the rack portion 24 by the supply of the stepping pulse, the rack portion 24 starts to be transferred or moved. When the feed screw portion 23 is moved in the same direction (+X direction), the rack portion 24 is transferred in the +X direction corresponding to the number of the stepping pulses (driving pulses) which are supplied because the teeth of the feed screw portion 23 and the rack portion 24 are engaged with each other (a state P4) [Transfer Period].

Accordingly, the number of the stepping pulses (or driving pulses) required for a change from the position (A) in which the feeding direction of the feed screw portion 23 is reversed in the state in which the teeth of the feed screw portion 23 and the rack portion 24 are engaged with each other to the state (i.e., the position B) in which the teeth of the feed screw portion 23 and the rack portion 24 are engaged with each other corresponds to the backlash between the feed screw portion 23 and the rack portion 24. In the following, the backlash in the state in which the teeth of the feed screw portion 23 and the rack portion 24 are engaged with each other (i.e., a state in which the respective teeth come in contact with each other in one of rotating directions) will be referred to as a total backlash (or a total backlash value). The (total) backlash is varied depending on the manufacturing accuracy and assembly precision of the feed screw portion 23 and the rack portion 24.

The backlash calculator 33 determines the number of the stepping pulses and the feeding (or driving) direction of the feed screw portion 23 based on a stepping pulse signal sent from the driving control unit 32. More specifically, if the total backlash is previously known, it is possible to determine the position in the dead zone corresponding to a current position, hence, a backlash in the transfer direction (or moving direction), using a previous stepping pulse signal. Accordingly, it is possible to determine a feeding direction and to calculate a feeding amount (i.e., an up-count value or a down-count value, respectively) required for getting out of the dead zone. For example, description will be made by taking FIG. 2 as an example. When the transfer is carried out in a positioning state in P2 in the dead zone in the direction of the position A in the drawing to get out of the dead zone, the down-count value is 2 (the number of the stepping pulses is −2). In the case in which the transfer is carried out in a position corresponding to the state P3 in the direction of the position B to get out of the dead zone, the upcount value is 3. When the transfer is carried out in the direction from a position corresponding to the state P1 to the position B in the drawing, or in the direction from a position corresponding to the state P4 to the position A to get out of the dead zone, it is necessary to drive the feed screw portion 23 based on the number of the stepping pulses corresponding to the total backlash.

The backlash calculator 33 stores information about a current position based on a previous driving history. More specifically, the backlash calculator 33 stores a driving amount (an upcount value and a downcount value) required for getting out of the dead zone in both inner and outer peripheral directions.

Figure 3:
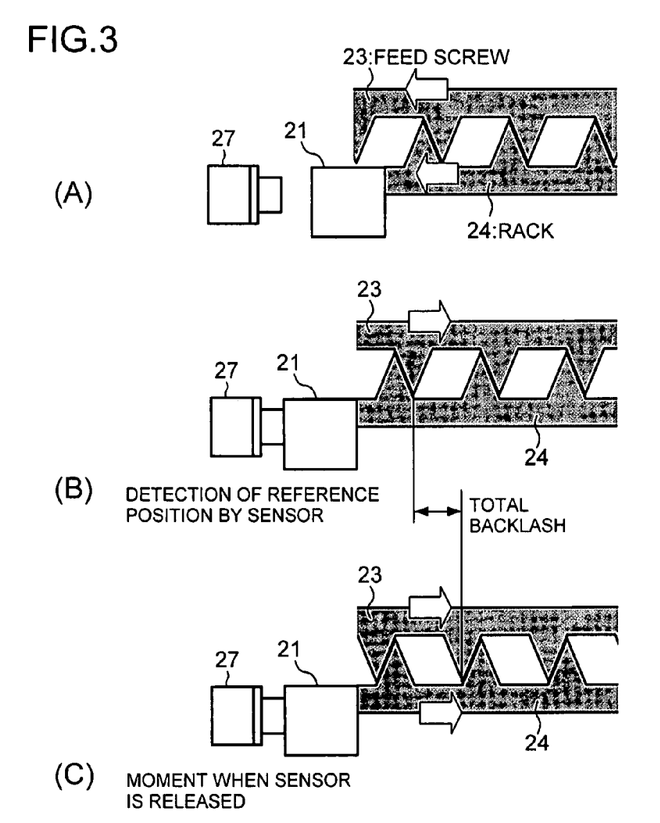
FIG. 3 is diagram for illustrating a method of calculating a total backlash with using a reference position sensor.

The total backlash can be known by a method shown in FIG. 3, for example. More specifically, when the power supply of the optical disc recording and/or reproducing apparatus is turned on, for example, the driving control unit 32 controls the sled motor 25 by the control of the controller 35 and moves the pickup support portion 21 (and hence, the rack portion 24) for holding the optical pickup 14 toward the inner periphery of the information recording region of the optical disc 11 at the end of the loading of the disc (FIG. 3(A)). When the pickup support portion 21 comes in contact with the reference position sensor 27, the movement of the optical pickup 14 is stopped in response to a detection signal sent from the reference position sensor 27, and the optical pickup 14 is controlled to be placed at a reference position (FIG. 3(B)). For example, the pickup support portion 21 is moved such that the optical pickup 14 is positioned on the innermost periphery of the information recording region of the optical disc 11. Next, the rotating direction of the sled motor 25 is reversed and the driving operation is started to transfer or move the rack portion 24 (the pickup support portion 21) in an opposite direction (i.e., in an outer peripheral direction). However, the rack portion 24 is not transferred due to the dead zone generated by the backlash with the feed screw portion 23. During this time period, the detection signal of the photodetector 16, for example, a tracking error signal is not changed. Then, the reference position sensor 27 is released at time of the escape from the dead zone (FIG. 3(C)) so that the transfer is started. A section from the detection of the reference position sensor 27 to the release thereof is set to be the total backlash. Accordingly, a driving amount corresponding to the dead zone (for example, the number of the stepping pulses) is obtained as the total backlash.

The backlash calculator 33 is operated as a saturation counter in which a feeding step to be added and subtracted every driving step is set to be an input and a dynamic range has a total backlash value. It is possible to calculate, from a counter value, a current backlash reflected by a previous driving history (a backlash from a current position in the inner and outer peripheral directions). By the backlash calculator 33, accordingly, it is possible to greatly improve a transfer capability by performing the driving operation at a high speed for a period in which the backlash is not cancelled or waiting for the start timing of a track jump till the cancellation of the backlash when performing the jump.

Figure 4:
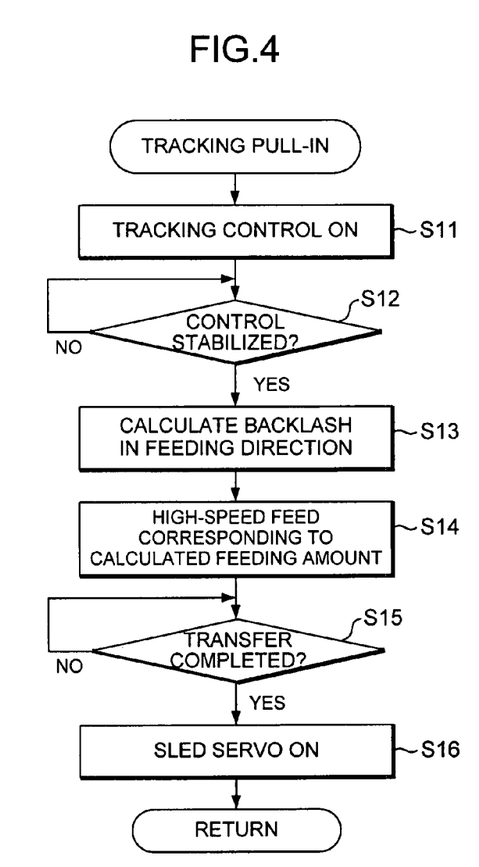

A control in the execution of tracking pull-in will be described below with reference to a flowchart shown in FIG. 4.

Conventionally, a sled control is started (or ON) at the same time when a tracking control is started (or ON) or immediately after the tracking control is stabilized. However, a dead zone is generated for a long period till the cancellation of the backlash even if the sled motor is driven. Therefore, the objective lens is biased greatly when the backlash is large. In the worst case, the tracking operation becomes out of control. In the dead state, a driving load is small. For this reason, the driving operation can be carried out at a high speed. The moment that the backlash is cancelled, the driving load is suddenly increased. Therefore, a drawback such as a loss of synchronism or a step-out is caused.

In the embodiment, first of all, the tracking control is started under the control of the pickup control unit 31 (tracking control: ON) (Step S11). The pickup control unit 31 has a tracking servo determining portion for determining whether a tracking servo is stabilized or not. More specifically, it is determined by the tracking servo determining portion whether the tracking control is stabilized or not (Step S12). If it is determined that the tracking control is stabilized, a backlash in a feeding direction is calculated by the backlash calculator 33. In other words, a driving amount required for canceling the backlash in the feeding direction (an upcount value or a downcount value) is calculated (Step S13). The driving control unit 32 is operated, in cooperation with the controller 35, as a driving determining portion for determining whether or not the transfer portion (the sled motor 25) is driven by a backlash value in a direction in which the first engaging portion (the rack portion 24), that is, the optical pickup 14 is to be transferred or moved. More specifically, the driving control unit 32 sends, to the sled motor 25, the number of stepping pulses which is equivalent to the driving amount corresponding to the calculated backlash under the control of the controller 35 and transfers the feed screw portion 23 at a high speed, that is, a larger speed than a transfer speed in a sled control (Step S14). It is determined whether the transfer is completed or not (Step S15). When it is determined that the transfer is completed (that is, when the backlash is cancelled), a sled servo control is started (sled servo: ON) (Step S16).

In the execution of the tracking control, accordingly, the backlash value in the feeding direction is calculated, and driving is carried out at a high speed in accordance with the backlash value and an operation is performed to quickly get out of a dead state. Then, the sled servo is executed. Consequently, it is possible to stably execute the tracking control and the sled control.

Second Embodiment

Figure 5:
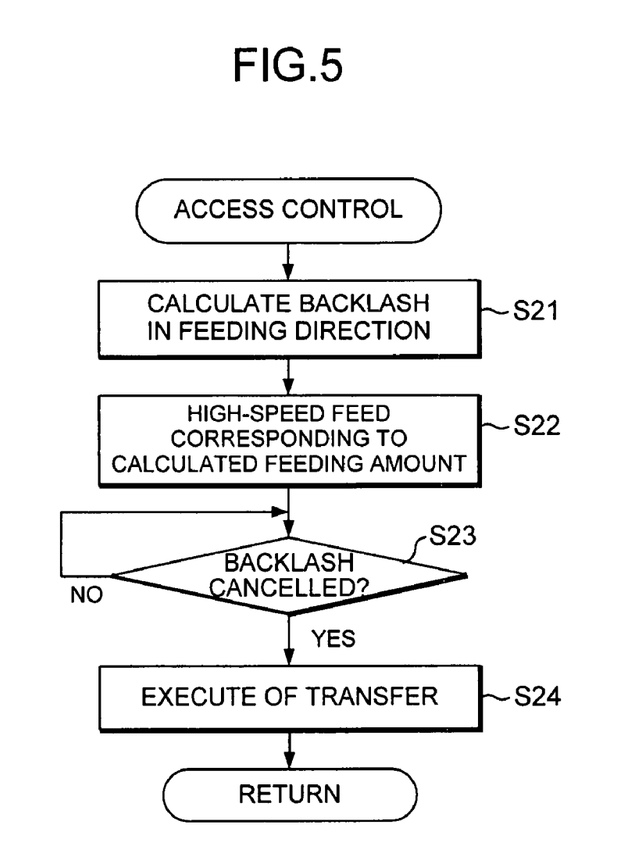
FIG. 5 is a flowchart showing a procedure for a transfer control in the execution of access to the desirable recording position of an optical disc 11 by an optical-pickup transfer apparatus according to a second embodiment of the present invention.

A transfer control in the execution of access to the desirable recording position of an optical disc 11 by an optical-pickup transfer apparatus 10 according to a second embodiment of the present invention will be described with reference to a flowchart shown in FIG. 5.

In the access operation, it is necessary to transfer or move an optical pickup 14 to a desirable position in a radial direction with respect to the rotation of the optical disc. First of all, a backlash value in a transfer direction (or moving direction) from a current position to an access position is calculated by a backlash calculator 33. More specifically, a driving amount (i.e., an upcount value or a downcount value) required for canceling a backlash in the transfer direction is calculated (Step S21). A driving control unit 32 sends, to a sled motor 25, a number of stepping pulses which is equivalent to a driving amount corresponding to the calculated backlash value under the control of a controller 35 to move a feed screw portion 23 (Step S22). It is determined whether the transfer is completed or not (that is, the backlash is cancelled or not) (Step S23). When it is determined that the backlash is cancelled, a sled feed is carried out by a transfer amount corresponding to a distance from the current position to the access position by the sled control (Step S24). In other words, even if the amount of the transfer from the current position to the access position is set and a driving command is executed, the transfer is not carried out corresponding to the backlash value so that a desirable position is not reached. According to the embodiment, however, a backlash value in the start of the transfer is calculated and driving is excessively carried out corresponding to the backlash value thus calculated. Therefore, it is possible to perform the transfer to a desirable access position rapidly and accurately.

Third Embodiment

Figure 6:
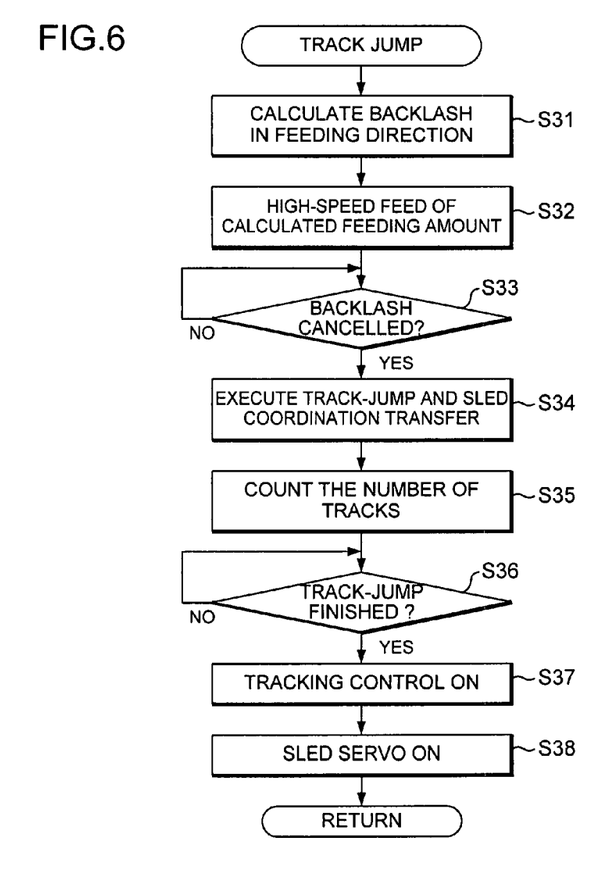
FIG. 6 is a flowchart showing a procedure for a transfer control in the execution of a track jump according to a third embodiment of the present invention.

A transfer control in the execution of a track jump by an optical-pickup transfer apparatus 10 according to a third embodiment of the present invention will be described with reference to a flowchart shown in FIG. 6.

Conventionally, at the same time that the track jump is started, a sled coordination transfer is also started generally. More specifically, the sled coordination transfer is carried out while a track jump for driving a tracking actuator is performed to cross a track based on a control signal (i.e., a tracking error). If a backlash is large, however, a dead period is generated until the backlash is cancelled even if a sled motor is driven. Consequently, the track jump is previously carried out so that a lens is biased greatly. In the worst case, accordingly, a swing-back phenomenon is generated to fail in the track jump or to cause a breakdown.

In the embodiment, first of all, a backlash value in a transfer direction from a current position to an access position is calculated by a backlash calculator 33 at time of the track jump. More specifically, a driving amount required for canceling a backlash in such a direction as to carry out the track jump is calculated (Step S31). A driving control unit 32 sends, to a sled motor 25, a driving amount (an upcount value or a downcount value) corresponding to the calculated backlash value under the control of a controller 35 to move a feed screw portion 23 (Step S32). It is determined whether the transfer is completed or not (that is, the backlash is cancelled or not) (Step S33). When it is determined that the backlash is cancelled, a sled feed is carried out with a transfer amount corresponding to a distance from the current position to the access position by the sled control (Step S34).

Next, an actual transfer for the track jump is carried out. More specifically, a sled coordination transfer is started at the same time that the track jump is started (Step S34). The number of tracks the optical pickup 14 crossed over is counted (Step S35) and it is determined whether the track jump is ended or not (Step S36). If it is determined that the track jump is ended, the tracking control is started (Step S37), and a sled servo control is executed (Step S38).

Accordingly, at the start of the track jump, the track jump is started after the driving operation is carried out excessively corresponding to the backlash value. Consequently, the timings of the coordination operations of the driving of a tracking actuator and the sled transfer are coincident with each other. Therefore, it is possible to carry out a stable track jump.

Fourth Embodiment

Figure 7:
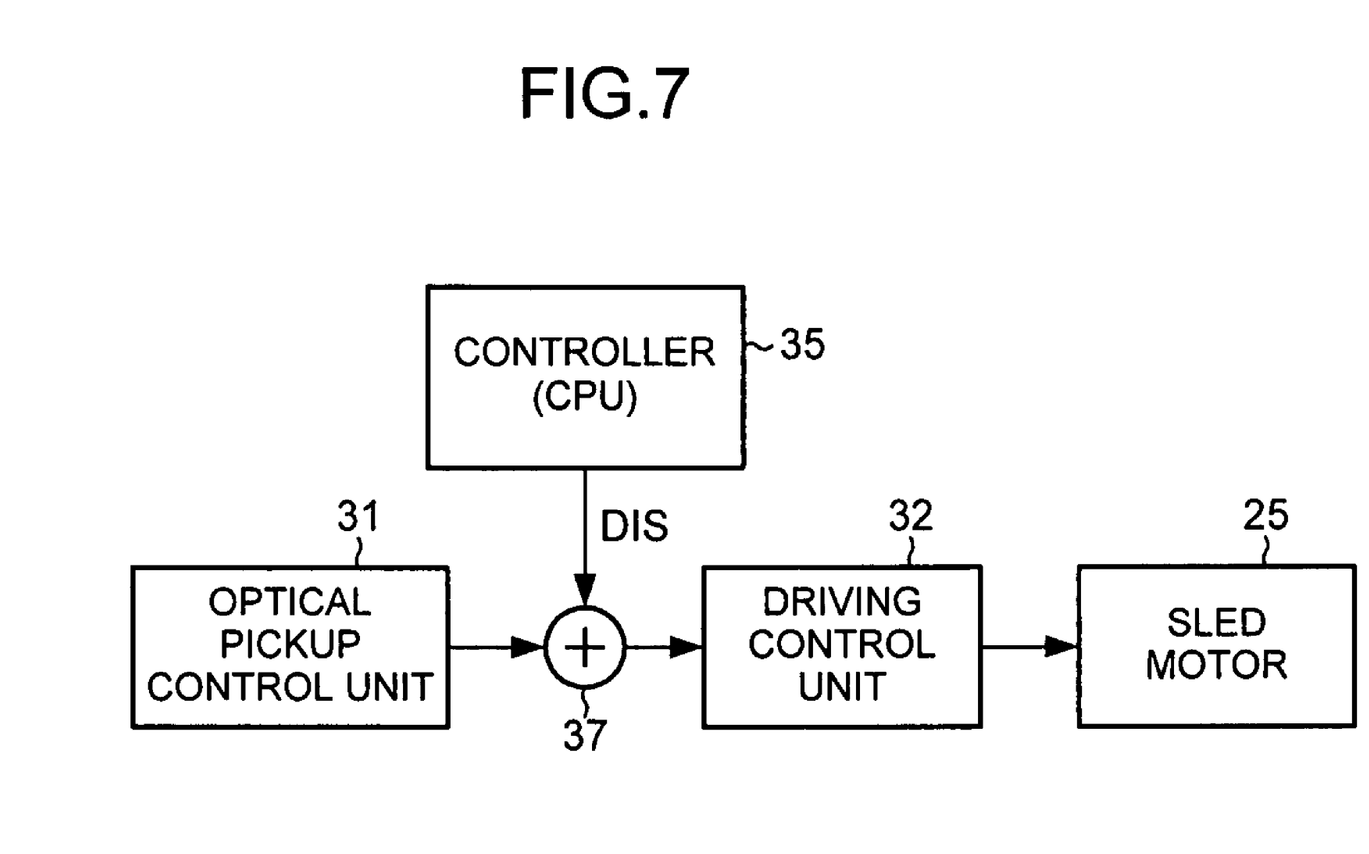
FIG. 7 is a diagram schematically showing another method of calculating a total backlash value in the optical-pickup transfer apparatus.
Figure 8:
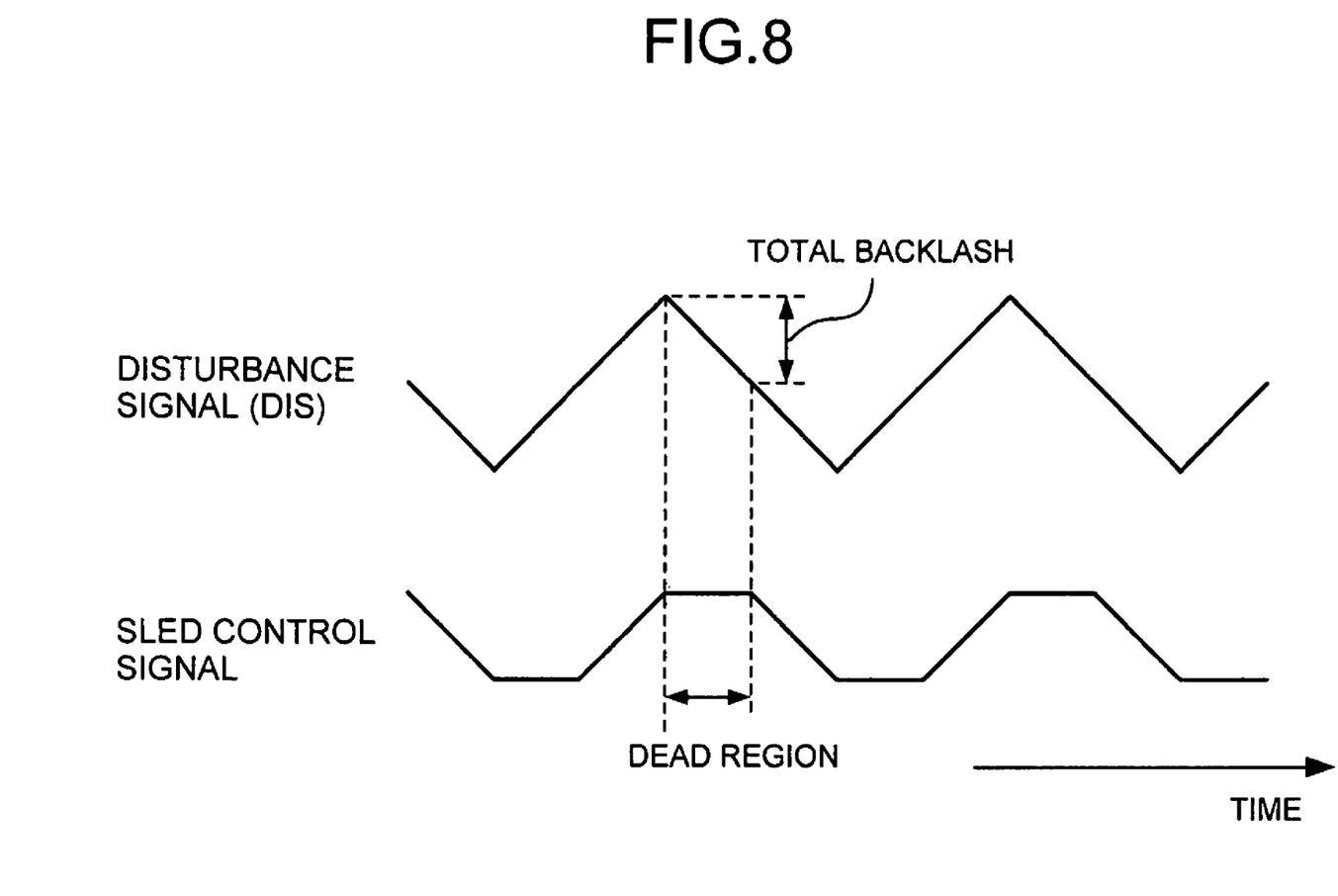
FIG. 8 is a diagram showing a disturbance signal (DIS) and a sled control signal in the method illustrated in FIG. 7.

Description will be made to another method of calculating a total backlash value in an optical-pickup transfer apparatus 10. FIG. 7 is a block diagram schematically showing a configuration for calculating a backlash value by using a disturbance signal. More specifically, the disturbance signal (DIS) is superposed on a sled control signal generated in a pickup control unit 31 in an adder 37 and is supplied to a driving control unit 32. The disturbance signal (DIS) is superposed on the sled control signal when tracking and sled servo controls are performed. The disturbance signal (DIS) is a saw-toothed wave (i.e., triangular wave) signal supplied from a controller 35 as shown in FIG. 8, for example. In this case, a feed screw portion 23 is moved by means of a sled motor 25 to alternately drive an optical pickup 14 in inner and outer peripheral directions. However, there is generated a period in which the transfer is not carried out due to a dead zone by a backlash between the feed screw portion 23 and a rack portion 24 as described above. Accordingly, a dead region or dead zone (i.e., a flat region in the drawing) which does not follow a disturbance signal taking the shape of a triangular wave appears on the sled control signal. More specifically, driving amount corresponding to the flat region is obtained as a total backlash value.

Fifth Embodiment

In the embodiments described above, the description has been made for a case in which the stepping motor is used for the sled motor 25 and the stepping pulses are thus counted. However, it is also possible to use a driving device of another type, for example, a DC motor. When using a stepping motor, a driving input thereto is converted to an output corresponding to a position. When the DC motor is used, a driving input thereto is converted to an output corresponding to a speed of transfer.

Figure 9:
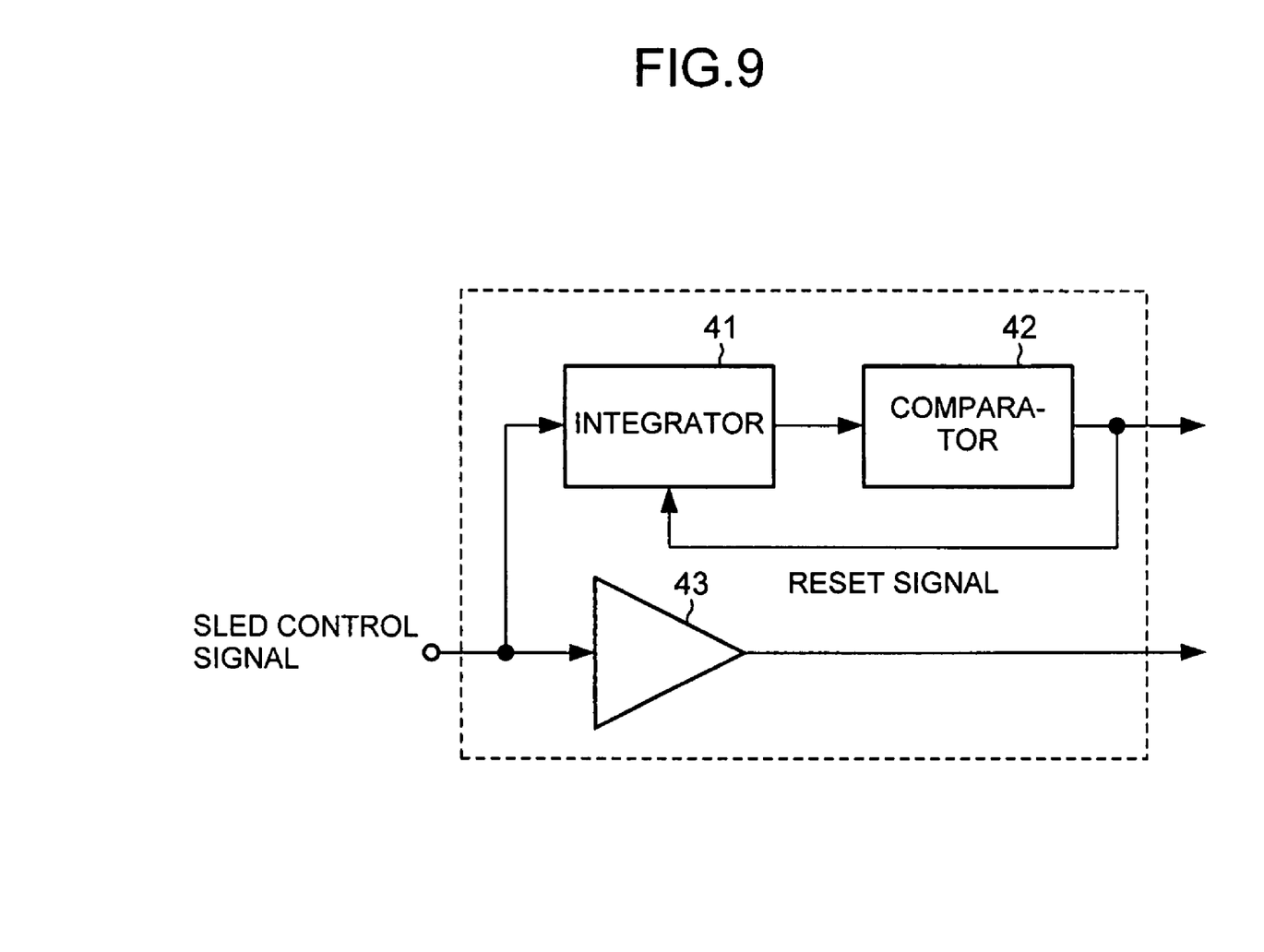
FIG. 9 is a block diagram showing a configuration for generating a sled driving signal and a step signal from a sled control signal when a DC motor is used.
Figure 10:
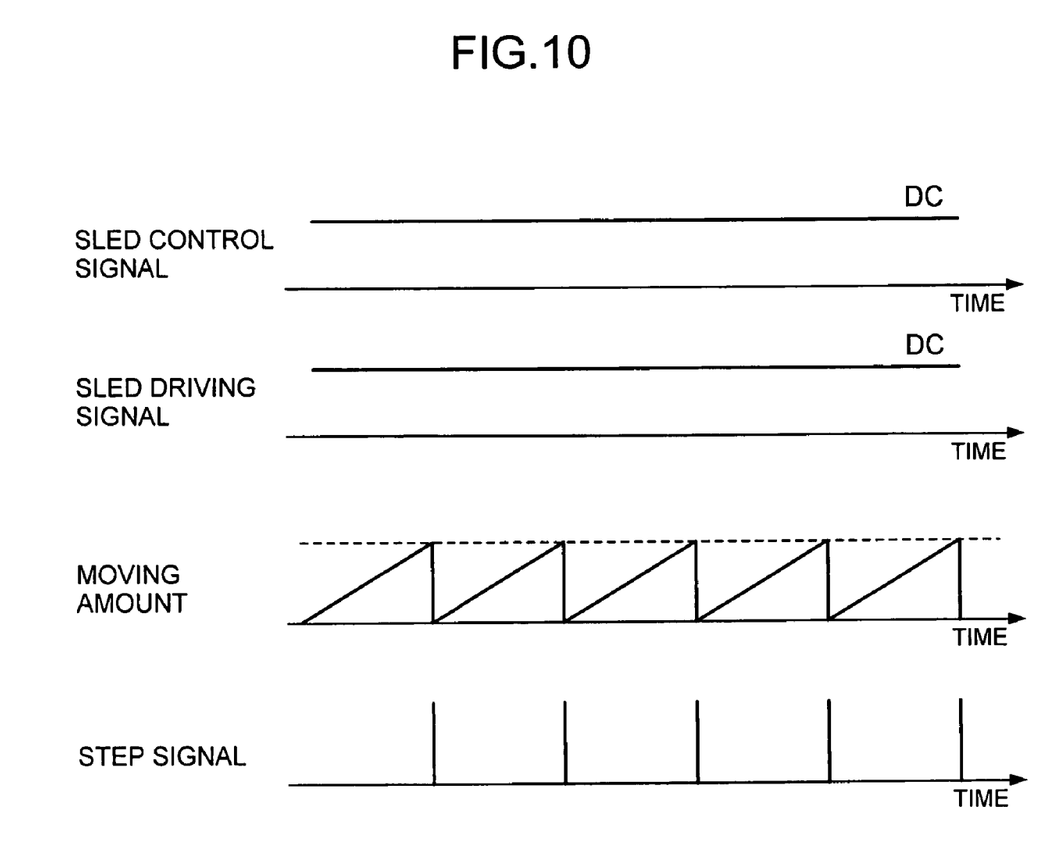
FIG. 10 is a diagram showing a sled control signal (DC signal), a sled driving signal and a step signal in the configuration illustrated in FIG. 9.

FIG. 9 is a block diagram showing a configuration for generating a sled driving signal and a step signal from a sled control signal, and the configuration is provided in the driving control unit 32, for example. As shown in FIG. 10, the sled control signal (DC signal) is amplified by an amplifier 43 so that the sled driving signal is generated. Moreover, the sled control signal is integrated by an integrator 41 and a speed-position (i.e., moving amount) conversion is carried out. A position signal obtained by the conversion is compared with a unit moving amount in a comparator 42 so that the step signal is generated. By using the step signal, it is possible to carry out a transfer control in the same manner as in the embodiments in which the stepping motor is utilized.

As described above in detail, even if the backlash is present, the influence of the backlash can be suppressed and a transfer operation with high precision can be carried out.

While the description has been made by taking the case in which the rack structure is used as the first engaging portion for holding the optical pickup 14 and the feed screw structure is used as the second engaging portion in the feed driving portion in the embodiments, it is also possible to use a member having various engaging portions such as a pair of screws, racks, bolts, nuts and gears which are engaged with each other and can transfer the optical pickup 14 (the holding portion 21) in a radial direction.

Moreover, the embodiments can be applied in a proper combination. For instance, the first to third embodiments may be combined to constitute an optical-pickup transfer apparatus having at least two or all of a tracking pull-in control, a transfer control in the execution of access and a transfer control to be carried out at time of a track jump.

The invention claimed is:

1. A pickup transfer apparatus for transferring an optical pickup in a radial direction of a recording medium, comprising:
   a first engaging portion for holding the optical pickup;
   a second engaging portion to be engaged with the first engaging portion;
   a transfer portion for driving the second engaging portion to transfer the first engaging portion in the radial direction;
   a calculating portion for calculating a backlash value between the first and second engaging portions in a transfer direction of the first engaging portion; and
   a driving control unit for controlling the transfer portion based on the backlash value calculated in the calculating portion.

2. The pickup transfer apparatus according to claim 1, wherein the calculating portion calculates a total backlash value between the first and second engaging portions based on a driving amount of the transfer portion and a transfer amount of the first engaging portion when transferring the first engaging portion while reversing the transfer direction of the first engaging portion.

3. The pickup transfer apparatus according to claim 1, wherein the calculating portion calculates the backlash value between the first and second engaging portions in the transfer direction of the first engaging portion based on a total backlash value.

4. The pickup transfer apparatus according to claim 2, further comprising a driving determining portion for determining whether or not the transfer portion is driven in accordance with the backlash value in the direction in which the first engaging portion is to be transferred; and
   a transfer control unit for controlling the transfer of the transfer portion when it is determined that the transfer portion is driven in accordance with the backlash value in the transfer direction.

5. The pickup transfer apparatus according to claim 4, further comprising a tracking servo portion for performing a tracking servo control of the optical pickup and a tracking servo determining portion for determining whether a tracking servo is stabilized or not,
   wherein the driving control unit drives the transfer portion in accordance with the backlash value in the direction in which the first engaging portion is to be transferred when it is determined that the tracking servo is stabilized.

6. The pickup transfer apparatus according to claim 4, wherein a driving speed in the operation for driving the transfer portion in accordance with the backlash value in the direction in which the first engaging portion is to be transferred is larger than a driving speed in the transfer control.

7. The pickup transfer apparatus according to claim 4, wherein the transfer control unit includes a transfer servo for performing a transfer servo control of the transfer portion.

8. The pickup transfer apparatus according to claim 2, further comprising:
   a driving determining portion for determining whether or not the transfer portion is driven in accordance with the backlash value in the direction in which the first engaging portion is to be transferred; and
   a tracking jump portion for performing track-jump of the optical pickup when it is determined that the transfer portion is driven in accordance with the backlash value in the transfer direction.

9. The pickup transfer apparatus according to claim 2, wherein the transfer portion includes a stepping motor, and the calculating portion calculates the total backlash value and the backlash value between the first and second engaging portions in the transfer direction of the first engaging portion based on the number of pulses which drive the stepping motor.

10. A method of transferring a pickup which transfers an optical pickup held in a first engaging portion in a radial direction of a recording medium by driving a second engaging portion to be engaged with the first engaging portion, comprising the steps of:
    calculating a backlash value between the first and second engaging portions in a transfer direction of the first engaging portion; and
    driving the second engaging portion on the basis of a calculated backlash value to transfer the first engaging portion.

* * * * *